United States Patent [19]

Occelli

[11] Patent Number: 5,076,907
[45] Date of Patent: Dec. 31, 1991

[54] MIDDLE DISTILLATE HYDROCRACKING PROCESS

[75] Inventor: Mario L. Occelli, Yorba Linda, Calif.

[73] Assignee: Union Oil Company of California, Los Angeles, Calif.

[21] Appl. No.: 672,163

[22] Filed: Mar. 19, 1991

Related U.S. Application Data

[62] Division of Ser. No. 531,460, May 31, 1990, Pat. No. 5,023,221.

[51] Int. Cl.$^5$ .............................................. C10G 47/00
[52] U.S. Cl. ................................... 208/111; 208/108; 208/109; 208/110; 208/112
[58] Field of Search .......................... 208/111, 111 MC

[56] References Cited

U.S. PATENT DOCUMENTS

| | | | |
|---|---|---|---|
| Re. 31,036 | 9/1982 | Inooka et al. | 502/244 |
| 3,632,500 | 1/1972 | Csicsery et al. | 502/63 |
| 3,844,978 | 10/1974 | Hickson | 502/68 |
| 3,963,644 | 6/1976 | Hansford | 502/68 |
| 4,010,116 | 3/1977 | Secor et al. | 502/68 |
| 4,176,090 | 11/1979 | Vaughan et al. | 423/328 |
| 4,248,739 | 2/1981 | Vaughan et al. | 423/328 |
| 4,401,556 | 3/1983 | Bezman et al. | 208/111 |
| 4,517,074 | 5/1985 | Ward | 208/111 |
| 4,530,753 | 7/1985 | Shiroto et al. | 208/68 |
| 4,637,991 | 1/1987 | Battiste et al. | 502/68 |
| 4,762,813 | 8/1988 | Ward | 502/68 |
| 4,803,060 | 2/1989 | Occelli | 423/326 |
| 4,844,790 | 7/1989 | Occelli | 208/119 |
| 4,946,579 | 8/1990 | Occelli | 208/111 |
| 4,990,476 | 2/1991 | Ward | 502/64 |
| 4,995,963 | 2/1991 | Occelli | 208/111 |

FOREIGN PATENT DOCUMENTS

WO88/06488 9/1988 PCT Int'l Appl. .
WO88/06614 9/1988 PCT Int'l Appl. .
2014970 6/1982 United Kingdom .

OTHER PUBLICATIONS

Toshio Itoh and Yukihiro Tsuchida, "New Catalyst for Hydrocracking of Vacuum Residue," *Applied Catalysis,* vol. 51, 1989, pp. 213-222.
M. L. Occelli and R. J. Rennard, "Hydrocracking with Pillared Clays," *American Chemical Society Division of Fuel Chemistry,* Preprints of Papers, vol. 29, No. 6, 1984, pp. 30-39.

*Primary Examiner*—Helane E. Myers
*Attorney, Agent, or Firm*—Yale S. Finkle; Gregory F. Wirzbicki

[57] ABSTRACT

A midbarrel hydrocracking catalyst for use in producing middle distillate products from hydrocarbon feedstocks via hydrocracking comprises at least one hydrogenation component, preferably one containing a metal selected from Group VIB and/or Group VIII of the Periodic Table of Elements, a layered magnesium silicate such as sepiolite, an intercalated clay such as pillared clay, and, optionally, a crystalline molecular sieve, preferably a zeolitic molecular sieve such as the modified Y zeolite known as LZ-10 zeolite.

31 Claims, No Drawings

1

MIDDLE DISTILLATE HYDROCRACKING PROCESS

CROSS REFERENCE TO RELATED APPLICATIONS

This application is a division of U.S. Pat. application Ser. No. 531,460, filed in the U.S. Pat. and Trademark Office on May 31, 1990 now U.S. Pat. No. 5,023,221.

BACKGROUND OF THE INVENTION

This invention relates to a hydrocracking catalyst and a process in which the catalyst is employed. The invention is particularly concerned with a catalyst containing a layered magnesium silicate and an intercalated clay which, when used as a hydrocracking catalyst, selectively yields middle distillates.

Petroleum refiners often produce desirable products such as turbine fuel, diesel fuel, and other products known a middle distillates as well as lower boiling liquids, such as naphtha and gasoline, by hydrocracking a hydrocarbon feedstock derived from crude oil. Feedstocks most often subjected to hydrocracking are gas oils and heavy gas oils recovered from crude oil by distillation. A typical gas oil comprises a substantial proportion of hydrocarbon components boiling above about 700° F., usually at least about 50 percent by weight boiling above 700° F. A typical heavy gas oil normally has a boiling point range between about 600° F. and 1050° F.

Hydrocracking is generally accomplished by contacting, in an appropriate reaction vessel, the gas oil or other feedstock to be treated with a suitable hydrocracking catalyst under conditions of elevated temperature and pressure in the presence of hydrogen so as to yield a product containing a distribution of hydrocarbon products desired by the refiner. Although the operating conditions within a hydrocracking reactor have some influence on the yield of the products, the hydrocracking catalyst is the prime factor in determining such yields. At the present time, middle distillates are not in high demand relative to gasoline in the United States, however, marketing surveys indicate that there will be an increased demand for middle distillates as the year 2000 approaches. For this reason, refiners have recently been focusing on midbarrel hydrocracking catalysts which selectively produce middle distillate fractions, such as turbine fuel and diesel fuel, that boil in the 300° F. to 700° F. range.

The three main catalytic properties by which the performance of a midbarrel hydrocracking catalyst is evaluated are activity, selectivity, and stability. Activity may be determined by comparing the temperature at which various catalysts must be utilized under otherwise constant hydrocracking conditions with the same feedstock so as to produce a given percentage, normally about 60 percent, of products boiling below 700° F. The lower the activity temperature for a given catalyst, the more active such a catalyst is in relation to a catalyst of higher activity temperature. Selectivity of midbarrel or middle distillate hydrocracking catalysts may be determined during the foregoing described activity test and is measured as the percentage fraction of the 700° F.- product boiling in the desired midbarrel product range, e.g., 300° F. to 700° F. for diesel fuel and 300° F. to 550° F. for turbine fuel. Stability is a measure of how well a catalyst maintains its activity over an extended time period when treating a given hydrocarbon feedstock under the conditions of the activity test. Stability is generally measured in terms of the change in temperature required per day to maintain a 60 percent or other given conversion.

U.S. Pat. Nos. 4,062,809 and 4,419,271, the disclosures of which are hereby incorporated by reference in their entireties, disclose two different types of very effective middle distillate hydrocracking catalysts. The catalyst of U.S. Pat. No. 4,062,809 contains molybdenum and/or tungsten plus nickel and/or cobalt on a support of silica-alumina dispersed in gamma alumina. U.S. Pat. No. 4,419,271 teaches that the catalyst of U.S. Pat. No. 4,062,809 can be improved by adding an aluminosilicate zeolite to the support, thereby producing a catalyst containing molybdenum and/or tungsten and nickel and/or cobalt supported on a mixture of an aluminosilicate zeolite, preferably an ultrahydrophobic zeolite known as LZ-10 zeolite, in combination with a dispersion of silica-alumina in a gamma alumina matrix. The presence of the zeolite in this catalyst increases the activity of the catalyst without significantly affecting the selectivity.

Although the catalysts of the above-discussed patents are highly effective middle distillate hydrocracking catalysts and have proven themselves in commercial environments, there is always a demand for new hydrocracking catalysts with superior overall activity, selectivity, and stability for middle distillate hydrocracking.

SUMMARY OF THE INVENTION

In accordance with the invention, it has now been found that catalysts containing at least one hydrogenation component, a layered magnesium silicate, and an intercalated clay having cracking activity exhibit very high activities and selectivities when used to produce middle distillate products via the hydrocracking of a hydrocarbon feedstock. Typically, such catalysts will contain, in addition to the above components, a crystalline, zeolitic or nonzeolitic molecular sieve having cracking activity. The hydrogenation component normally contains a metal selected from Group VIB and/or Group VIII of the Periodic Table of Elements and is usually deposited on a support comprising the layered magnesium silicate, the intercalated clay and, optionally, the zeolitic or nonzeolitic crystalline molecular sieve.

The intercalated clay which may be used as a component of the catalyst is typically a pillared or delaminated clay while the layered magnesium silicate is normally selected from the group consisting of sepiolite, attapulgite, saponite, chrysotile, and hectorite, with sepiolite being preferred. The optional molecular sieve which may be present in the catalyst is preferably a zeolitic molecular sieve such as a modified Y zeolite but can also be a nonzeolitic molecular sieve such as a crystalline silica, a silicoaluminophosphate, a galliosilicate, and the like.

Preliminary tests indicate that the catalyst of the invention, when used in hydrocracking to produce middle distillate products such as diesel fuel and turbine fuel, has a higher activity and selectivity than other middle distillate catalyst now commercially available for use in midbarrel hydrocracking processes. Thus, the catalyst of the invention appears to be a significant improvement in the art of midbarrel hydrocracking.

DETAILED DESCRIPTION OF THE INVENTION

The hydrocracking catalyst of the invention comprises a hydrogenation component normally deposited on a support comprising a layered magnesium silicate, an intercalated clay having cracking activity and, optionally, a zeolitic or nonzeolitic, crystalline molecular sieve having cracking activity. The layered magnesium silicate which can be used as a component of the catalyst is a naturally occurring or synthetic layered clay composed of platelets stacked one on top another to form aggregates in which alkali metal and alkaline earth metal cations are interposed between the platelets in order to balance charge deficiencies. Each platelet can be visualized as a sandwich with the two outer layers or planes composed primarily of chains containing silicon in tetrahedral coordination with oxygen atoms and the inner layer containing magnesium in octahedral coordination with oxygen atoms. The outer layers may contain elements in addition to silicon and oxygen, while the inner layer may contain elements in addition to magnesium and oxygen. The stacked arrangement of platelets normally has a repeating structure about every 10 angstroms. Specific examples of layered magnesium silicates which can be used as a component of the catalyst include hectorite and saponite, which are both smectite minerals, and sepiolite and attapulgite. These layered magnesium silicates, among others, are described in detail in the book entitled *Clay Mineralogy*, Second Edition, authored by Ralph E. Grimm and published by the McGraw-Hill Book Company in 1968, the disclosure of which book is hereby incorporated by reference in its entirety. Another layered magnesium silicate which can be used is known as chrysotile, a mineral which is the source of serpentine asbestos.

Sepiolite is the preferred layered magnesium silicate for use in the catalyst of the invention. Sepiolite is a fibrous phyllosilicate consisting of three pyroxene-like chains extending parallel to the a-axis. These chains are joined to yield 2:1 phyllosilicate ribbons, which are linked by inversion of $SiO_4$ tetrahedra along adjacent edges. Discontinuities at the sites of inversion lead to the development of an open structure characterized by discontinuous octahedral sheets, continuous tetrahedral sheets, and structural channels oriented along the fiber axis. The channels have approximate cross-sectional dimensions of $10.6 \times 3.7$ Å, giving sepiolite a large internal surface area. Sepiolite has a lath-shape or fibrous morphology and is found in natural deposits around the world usually in the form of needles consolidated or bonded weakly in parallel orientation. A rationalization formula for sepiolite can be written as $H_6Mg_8Si_{12}O_{30}(OH)_{10} \cdot 6H_2O$. Although most forms of sepiolite contain only magnesium, silicon, hydrogen and oxygen, there are some known forms that contain small amounts of aluminum substituted for magnesium and/or silicon atoms. Such forms of sepiolite normally contain less than 5, typically less than 2, weight percent aluminum and are more acidic than their aluminum-free counterparts.

Attapulgite, which is in the same class of minerals as sepiolite, is somewhat similarly structured, except that there is at least some substitution of aluminum atoms for either silicon or magnesium atoms. Hectorite and saponite, which are both smectite minerals, contain elements in addition to magnesium and silicon in their unit cell structures. Hectorite contains lithium which is substituted for a portion of the magnesium present whereas saponite contains aluminum substituted for a portion of the silicon present. Representative formulas for hectorite and saponite are, respectively, $Na_{0.66}[(OH)_4 \cdot Si_8(Mg_{5.34} \cdot Li_{0.66})O_{20}]$ and $Na_{0.66}[(OH)_4 \cdot Si_{7.34} \cdot Al_{0.66})Mg_6O_{20}]$.

The intercalated clay component of the catalyst of the invention is typically a pillared clay or a delaminated clay which has cracking activity. Such clays are typically formed by intercalating a pillaring agent, such as thermally stable, robust, three-dimensional or polynuclear cations, colloidal particles and the like, between the silicate layers or platelets of smectite clays, which clays are a well-known class of naturally occurring and synthetic layered clays which swell or expand when exposed to moisture. The intercalation is normally accomplished by replacing, typically via ion exchange, naturally occurring interlayered hydrated cations such as sodium cations with the pillaring agent. This is typically carried out by reacting an unexpanded, swelling clay, usually in an aqueous medium, with polyoxymetal cations, mixtures of polyoxymetal cations, colloidal particles comprising silica, alumina, titania, tin oxide, chromia, zirconia, niobia, iron oxide, a rare earth oxide, antimony oxide, other metal oxides or mixtures thereof, and cationic metal clusters comprising molybdenum, tungsten, nickel, cobalt or the like. The shape and size of the intercalated pillaring agents allow them to serve, upon the drying and calcining of the clay, as molecular pillars to prop apart the layers of the clay and thereby prevent them from collapsing.

The polyoxymetal cations suitable for use in synthesizing intercalated clays are sometimes referred to as polymeric cationic hydroxy metal complexes or as inorganic metal polymers and are formed by the hydrolysis of metal salts. Such complexes or polymers are described in detail in U.S. Pat. Nos. 4,176,090, 4,271,043, and 4,248,739, which patents are hereby incorporated by reference in their entireties. The most preferred pillaring agents for use in preparing intercalated clays are the polyoxymetal cations of aluminum, zirconium, chromium, iron or their mixtures. Specific types of polyoxyaluminum cations that may be used include cations having the empirical formula $[Al_{13}O_4(OH)_{24}(H_2O)_{12}]^{+7}$, which cations are found in solutions of aluminum chlorhydroxide, and polyoxyaluminum cations prepared by hydrolyzing an aqueous solution of aluminum chloride. A preferred polyoxyzirconium cation for use as a pillaring agent has the empirical formula $[Zr_4(OH)_{14}(H_2O)_{10}]^{+2}$ and is found in solutions of zirconyl chlorhydroxide. Such solutions are prepared by dissolving zirconyl chloride in distilled water and then aging the resultant solution.

The cationic metal clusters which may be used as a pillaring agent include polynuclear metal halides containing molybdenum or tungsten. Examples of such halides include $Mo_6Cl_{12}$ and $W_6Cl_{12}$ which are prepared by reacting NaCl, $MoCl_5$ or $WCl_5$ and molybdenum or tungsten metal at a high temperature. The preparation and properties of these halides are described in detail in the article entitled "Convenient Synthesis of the Hexanuclear Molybdenum (II) Halides $Mo_6Cl_{12}$ and $Mo_6Br_{12} \cdot 2H_2O$" published in the *Inorganic Nuclear Chemistry Letters*, Vol. 16, pp. 307–310, (1980). The disclosure of this article is hereby incorporated by reference in its entirety. Other suitable cationic metal clusters contain nickel or cobalt and are prepared by aging solutions of nickel or cobalt nitrate.

The pillared clays suitable for use as a component of the catalyst of the invention contain a fairly homogeneous distribution of pillars in the interlayered spaces which form an array Of rectangular openings, typically between about 6 to 20 angstroms high and between about 10 and 20 angstroms wide, which enable the pillared clay to behave like a two-dimensional sieve. By adjusting the size of the pillars or the spacing between such pillars, or both, the pore size of the pillared clay may be adjusted to suit a particular application. Pillared clays are typically prepared by reacting a smectite clay such as montmorillonite, hectorite, and beidellite, with a pillaring agent or propping agent to form a flocculated reaction product which is subsequently dried to convert the pillaring agent into inorganic metal oxide clusters which form the pillars which prop apart the layers of the clay. The X-ray diffraction pattern of a pillared clay normally contains a distinct first order reflection which is indicative of a well ordered, long range, face-to-face orientation of the clay platelets.

A preferred pillared clay for use in the catalyst of the invention is a montmorillonite which has been pillared with polyoxymetal cations of aluminum and therefore has alumina clusters as the pillars between the layers. Besides a single smectite clay such as montmorillonite, mixed layered smectites such as rectorite can also be pillared and used in the catalyst of the invention. Examples of pillared clays which possess stability at high temperatures are ones in which the pillars contain one or more rare earth elements such as cerium and/or lanthanum. Such clays are disclosed in U.S. Pat. No. 4,753,909 and in PCT Applications WO 88/06614 and WO 88/06488, the disclosures of which patent and applications are hereby incorporated by reference in their entireties. It will be understood, however, that pillared clays in which the pillars are substantially free of rare earth elements can be used as a component of the catalyst. Pillared clays and their preparation are described generally in an article entitled "Intercalated Clay Catalysts," *Science*, Vol. 220 No. 4595, pp. 365-371 (Apr. 22, 1983), the disclosure of which is hereby incorporated by reference in its entirety.

Another intercalated clay that can be used in the catalyst of the invention is known as a delaminated clay. These clays are made similarly to pillared clays by reacting an unexpanded, swelling clay with a pillaring agent such as polyoxymetal cations or colloidal particles. Unlike pillared clays in which the propped-apart platelets are oriented face to face, platelets in a delaminated clay, some of which platelets are propped apart by metal oxide pillars, contain edge-to-edge and edge-to-face linkages or connections which form a macrospace of a type found in amorphous aluminosilicate supports. Delaminated clays can be prepared by reacting Laponite clay, a synthetic hectorite manufactured by LaPorte Industries, Limited, and other trioctahedral smectite clays having a lath-shape morphology with polyoxymetal cations, colloidal metal and metal oxide particles, and cationic metal clusters as described in U.S. Pat. Nos. 4,629,712, 4,761,391 and 4,844,790, the disclosures of which are hereby incorporated by reference in their entireties. Because of the random orientation of platelets in a delaminated clay, the X-ray powder diffraction pattern of such clays, unlike that of a pillared clay, will not contain a distinct first order reflection.

It has been found that hydrocracking catalysts in which the support comprises an intercalated clay, such as a pillared clay, and a layered magnesium silicate, such as sepiolite, tend to be more active and selective for producing middle distillate products than commercially available catalysts which contain amorphous silica-alumina supports or supports containing a zeolite in combination with an amorphous silica-alumina material. It is believed that the intercalated or expanded clay provides more cracking activity than does a silica-alumina support while the layered magnesium silicate, because it is less acidic than most amorphous silica-aluminas, minimizes secondary cracking reactions which lead to less selectivity. Moreover, layered magnesium silicates can provide more macroporosity than amorphous supports and therefore tend to accommodate larger, higher molecular weight molecules which are subsequently cracked to components in the desired boiling range.

The support for the catalyst of the invention may contain, in addition to a layered magnesium silicate and an intercalated clay, a crystalline, nonzeolitic or zeolitic molecular sieve having cracking activity. Although the use of a large pore molecular sieve having pores defined by 12-membered rings of oxygen atoms and a pore size above 7 angstroms is preferred, an intermediate pore crystalline molecular sieve having pores defined by 10-membered rings of oxygen atoms and a pore size between 5.0 and 7.0 angstroms may also be used. The term "molecular sieve" as used herein refers to any material capable of separating atoms or molecules based on their respective dimensions. The term "pore size as used herein refers to the diameter of the largest molecule that can be sorbed by the particular molecular sieve in question. The measurement of such diameters and pore sizes is discussed more fully in Chapter 8 of the book entitled "Zeolite Molecular Sieves" written by D. W. Breck and published by John Wiley & Sons in 1974, the disclosure of which book is hereby incorporated by reference in its entirety. The term "nonzeolitic" as used herein refers to molecular sieves whose frameworks are not formed of substantially only silicon and aluminum atoms in tetrahedral coordination with oxygen atoms whereas the term "zeolitic" as used herein refers to molecular sieves whose frameworks are formed of substantially only silicon and aluminum atoms in tetrahedral coordination with oxygen atoms, such as the frameworks present in ZSM-5 zeolites, zeolite beta, zeolite L, zeolite omega, Y zeolites and X zeolites. Preferably, the molecular sieve used in the support will have a constraint index below 1.0.

Examples of nonzeolitic crystalline molecular sieves which may be used as a component of the catalyst of the invention include silicoaluminophosphates, aluminophosphates, ferrosilicates, galliosilicates, borosilicates, chromosilicates, titanium aluminosilicates, titanium silicates, titanium aluminophosphates, gallioaluminosilicates and crystalline silicas. Several of these nonzeolitic molecular sieves are discussed in more detail in U.S. Pat. Nos. 4,867,861 and 4,829,040, the disclosures of which are hereby incorporated by reference in their entireties. Examples of several galliosilicates which can be used as a component of the catalyst of the invention are galliosilicates substantialy free of alumina which have the faujasite structure, the zeolite L structure and the erionite structure. Such galliosilicates are described in detail, respectively, in U.S. Pat. Nos. 3,431,219, 4,419,907, and 4,931,266, which patents are hereby also incorporated by reference in their entireties. It will be understood that, although the catalyst of the invention may include a nonzeolitic molecular sieve as discussed above, catalysts which are essentially free of such sieves, including galliosilicates and the other specific nonzeolitic molecular sieves mentioned above, are within the scope of the invention.

Examples of zeolitic, crystalline molecular sieves which may be used in the catalyst of the invention include Y zeolites, X zeolites, zeolite beta, zeolite L, zeolite omega, mordenite, and modifications of such zeolites. However, the preferred zeolitic molecular sieves are Y zeolites and modified Y zeolites which possess cracking activity. U.S. Pat. No. 3,130,007, the disclosure of which is hereby incorporated by reference in its entirety, describes Y-type zeolites having framework silica-to-alumina mole ratios between 3.0 and 6.0 with a typical Y zeolite having a framework silica-to-alumina mole ratio of about 5.0.

The modified Y zeolites suitable for use as a component of the midbarrel hydrocracking catalyst of the invention are generally derived from Y zeolites by treatment which results in a significant modification of the Y zeolite framework structure, usually an increase in the framework silica-to-alumina mole ratio to a value typically above 6.0, and/or a reduction in unit cell size. It will be understood, however, that, in converting a Y zeolite starting material to a modified Y zeolite useful in the present invention, the resulting modified Y zeolite may not have exactly the same X-ray powder diffraction pattern for Y zeolites as is disclosed in U.S. Pat. No. 3,130,007. The d-spacings may be shifted somewhat due to a shrinkage in the unit cell size caused by an increase in the framework silica-to-alumina mole ratio. The essential crystal structure of the Y zeolite will, however, be retained so that the essential X-ray powder diffraction pattern of the modified zeolite will be consistent with that of either Y zeolite itself or a Y zeolite of reduced unit cell size. Examples of modified Y zeolites that can be used in the process of the invention include steam-stabilized Y zeolites, dealuminated Y zeolites, and ultrahydrophobic Y zeolites.

Steam-stabilized Y zeolites are Y zeolites which have been hydrothermally treated to increase the framework silica-to-alumina mole ratio but not the overall silica-to-alumina mole ratio of the zeolite. Steam stabilization normally involves calcination of the ammonium or hydrogen form of the Y zeolite starting material at relatively high temperatures, typically above about 900° F., in the presence of steam. This treatment results in the expulsion of tetrahedral aluminum from framework into nonframework positions, but normally does not remove the aluminum from the zeolite and therefore does not increase the overall silica-to-alumina mole ratio of the starting Y zeolite. An example of a steam stabilized Y zeolite is the one described in U.S. Pat. No. 3,929,672, the disclosure of which is hereby incorporated by reference in its entirety.

The dealuminated Y zeolites that can be used as a component of the midbarrel hydrocracking catalyst are Y zeolites which have been chemically treated with acids, salts, or chelating agents to increase the overall silica-to-alumina mole ratio. A preferred group of dealuminated zeolites is prepared by dealuminating a Y zeolite having an overall silica-to-alumina mole ratio below about 6.0 and is described in detail in U.S. Pat. Nos. 4,503,023 and 4,711,720, the disclosures of which patents are hereby incorporated by reference in their entireties. A preferred member of this group of zeolites is known as LZ-210, a zeolitic aluminosilicate molecular sieve having the Y-type structure which is available from UOP (formerly the Linde Division of the Union Carbide Corporation). LZ-210 zeolites and other zeolites of this group are conveniently prepared from a Y zeolite starting material in overall silica-to-alumina mole ratios between about 6.0 and about 20, although higher ratios are possible. Preferred LZ-210 zeolites have an overall silica-to-alumina mole ratio of about 6.1 to about 16. Typically, the unit cell size is at or below 24.65 angstroms and will normally range between about 24.40 and about 24.60 angstroms. LZ-210 zeolites having an overall silica-to-alumina mole ratio below 20 generally have a sorptive capacity for water vapor of at least 20 weight percent based on the anhydrous weight of the zeolite at 25° C. and 4.6 millimeters mercury water vapor partial pressure. Normally, the oxygen sorptive capacity at 100 millimeters mercury and −183° C. will be at least 25 weight percent. In general, LZ-210 zeolites are prepared by treating Y zeolites with an aqueous solution of a fluorosilicate salt, preferably a solution of ammonium hexafluorosilicate.

The preferred modified Y zeolite for use in the midbarrel hydrocracking catalyst of the invention is an ultrahydrophobic zeolite having a unit cell size between about 24.20 and about 24.45 angstroms, preferably between about 24.20 and 24.39 angstroms, most preferably between about 24.20 and 24.35 angstroms, and a sorptive capacity for water vapor less than about 5 weight percent, preferably less than about 4 weight percent, of the zeolite at 25° C. and a p/p° value of 0.10. The zeolites are the same or similar to the UHP-Y zeolites disclosed in U.S. Pat. No. 4,401,556 and U.K. Patent 2,014,970 published on June 29, 1982, the disclosures of which patents are hereby incorporated by reference in their entireties. According to these references, a UHP-Y zeolite is defined as a zeolite having a silica-to-alumina mole ratio of from 4.5 to 35, the essential X-ray powder diffraction pattern of zeolite Y, an ion exchange capacity of not greater than 0.070, a unit cell size from 24.20 to 24.45 angstroms, a surface area of at least 350 square meters per gram (BET), a sorptive capacity for water vapor less than 5 weight percent at 25° C. and a p/p° value of 0.10, and a Residual Butanol Test Value of not more than 0.4 weight percent. The Residual Butanol Test is a measure of the adsorptive selectivity of zeolite adsorbents for relatively nonpolar organic molecules under conditions in which there is active competition between water and less polar molecules for adsorption on the zeolite. The test procedure is described in detail in the above-identified patents.

Preferably, the ultrahydrophobic zeolite will have a silica-to-alumina mole ratio between about 4.5 and about 9, the essential X-ray powder diffraction of zeolite Y, an ion exchange capacity of not greater than 0.70, and a Residual Butanol Test Value of not more than 0.4 weight percent. More preferably, the ultrahydrophobic zeolite is LZ-10 zeolite, a modified Y zeolite having a silica-to-alumina mole ratio between about 4.5 and about 6.0, a surface area between about 500 and 700 square meters per gram, a unit cell size between about 24.20 and 24.35 angstroms, and a sorptive capacity for water vapor less than about 5 percent by weight of the zeolite at 25° C. and a p/p° value of 0.10.

The stability and/or acidity of the zeolitic or nonzeolitic molecular sieve may be increased by exchanging the molecular sieve with ammonium ions, polyvalent metal cations, such as rare earth-containing cations, magnesium cations, or calcium cations, or a combination of ammonium ions and polyvalent metal cations, thereby lowering the alkali metal content until it is less than about 0.8 weight percent, preferably less than about 0.5 weight percent, and most preferably less than about 0.3 weight percent, calculated as the monoxide. Methods of carrying out the ion exchange are well known in the art.

Normally, the layered magnesium silicate, the intercalated clay and, optionally, the nonzeolitic or zeolitic, crystalline molecular sieve are intimately mixed to form a support upon which the hydrogenation component(s) are subsequently deposited. The amount of the layered magnesium silicate in the support typically varies in the range from about 2 to 80 weight percent, preferably between about 5 and 50 weight percent and most preferably between about 10 and 30 weight percent, while the intercalated clay is present in the support in an amount between about 20 and about 98 weight percent, preferably between about 50 and about 95 weight percent and most preferably between about 65 and 90 weight percent. If it is desired to utilize a zeolitic or nonzeolitic molecular sieve in the support, the molecular sieve will typically be present in an amount between about 1 and about 30 weight percent, preferably between about 5 and about 20 weight percent. Typically, the layered magnesium silicate, besides contributing to the catalytic properties of the support, also serves as a binder to hold the other components of the support together. Thus, peptized alumina, pseudobohmite or other conventional binders are normally not required.

The catalyst of the invention is preferably prepared in particulate form by first comulling a wetted mixture of the layered magnesium silicate, the intercalated or expanded clay and, optionally, the zeolitic or nonzeolitic molecular sieve in proportions appropriate to what is desired in the final catalyst support. The comulled mixture is then extruded through a die having openings in the preferred shapes, normally circles, ellipses, three-leaf clovers, four-leaf clovers, and other polylobal shapes. Among preferred shapes for the die openings are ones that result in the extruded particles having cross-sectional shapes in the form of a cylinder or a three-leaf clover, as shown, for example, in FIGS. 8 and 8A of U.S. Pat. No. 4,028,227, the disclosure of which is hereby incorporated by reference in its entirety. The cross-sectional diameter of the particles is usually about 1/40 to ⅛ inch, preferably about 1/32 to about 1/12 inch, and most preferably about 1/24 to about 1/15 inch. Preferred clover-shaped particulates are such that each "leaf" of the cross-section is defined by a 270° arc of a circle having a diameter between about 0.02 and 0.05 inch. Other preferred particulates are those having quadralobal cross-sectional shapes, as is shown in FIG. 10 of U.S. Pat. No. 4,028,227.

After extrusion, the catalyst support particles are cut into lengths of from 1/16 to ½ inch, dried and calcined at an elevated temperature, normally between about 600° F. and 1600° F., to produce support particles of high crushing strength. These extruded support particles are then converted to catalyst particles by compounding, as by impregnation of the particles, with one or more precursors of at least one catalytically active hydrogenation metal component. The impregnation may be accomplished by any method known in the art, including spray impregnation wherein a solution containing the hydrogenation metal precursors in dissolved form is sprayed onto the support particles. Another method involves soaking the support particles in a large volume of the impregnation solution. Yet another method is the pore volume or pore saturation technique wherein the support particles are introduced into an impregnation solution of volume just sufficient to fill the pores of the support. On occasion, the pore saturation technique may be modified so as to utilize an impregnation solution having a volume between 10 percent less and 10 percent more than that which would just fill the pores. If the active metal precursors are incorporated by impregnation, a subsequent or second calcination, as for example at temperatures between 700° F. and 1400° F., will convert the metals to their respective oxide forms. In some cases, calcinations may follow each impregnation of individual active metals.

Alternative methods of introducing the active metal components into the catalyst include (1) mixing an appropriate solid or liquid containing the metal components with the materials to be extruded through the die and (2) impregnating the materials to be extruded with the desired metal components prior to carrying out the extrusion. Such methods may prove less expensive and more convenient than the impregnation methods discussed above and will also result in the active hydrogenation components being intimately mixed with the components of the support.

Hydrogenation components suitable for incorporation into the extruded catalyst support particles comprise metals selected from Group VIII and/or Group VIB of the Periodic Table of Elements. As used herein "Periodic Table of Elements" refers to the version found in the inside front cover of the *Handbook of Chemistry and Physics*, 65th Edition, published in 1984 by the Chemical Rubber Company, Cleveland, Ohio. Preferred hydrogenation components comprise metals selected from the group consisting of platinum, palladium, cobalt, nickel, tungsten, chromium, and molybdenum. Preferably, the catalyst contains at least one Group VIII metal component and at least one Group VIB metal component, with cobalt or nickel and molybdenum or tungsten being preferred combinations of active components and nickel and tungsten being most preferred. The catalyst will typically contain up to about 10, usually between about 1 and 8 weight percent, preferably between 2 and 6 weight percent, of a nonnoble Group VIII metal, calculated as the monoxide, and up to 30, usually from about 2 to about 28 weight percent, and preferably from between about 8 and 26 weight percent, of the Group VIB metal, calculated as the trioxide. If the hydrogenation component comprises a noble metal such as platinum or palladium, it is generally desired that the catalyst contain between about 0.03 and about 10 weight percent, preferably between about 0.10 weight percent and 3.0 weight percent, calculated as the metal.

It is preferred that the hydrogenation components of the catalyst of the invention be converted to the sulfide form prior to use. This may be accomplished by contacting the catalyst in the hydrocracking reactor with a gas stream consisting of hydrogen and about 10 volume percent hydrogen sulfide at an elevated temperature, usually between 300° F. and 700° F., for at least about 2 hours. Alternatively, if the hydrocarbon feedstock with which the catalyst is to be contacted contains organosulfur components, the catalyst may be merely placed in service in the oxide form, and, under typical hydrocracking conditions, the hydrogenation components of the catalyst will be readily converted to the sulfide form in situ. It should be understood, however, that the hydrogenation components of the catalyst can be converted to the sulfide form prior to the catalyst being loaded into the hydrocracking reactor by one of several techniques including the one described in U.S. Pat. No. 4,719,195, the disclosure of which is hereby incorporated by reference in its entirety.

The catalysts described above are useful in the conversion of a wide variety of hydrocarbon feedstocks via hydrocracking to more valuable products of lower average boiling point and lower average molecular weight which typically boil in the range between about 300° F. and about 700° F. The feedstocks that may be subjected to hydrocracking by the process of the invention include mineral oils and synthetic oils such as shale oil, oil derived from tar sands, coal liquids, and the like. Examples of appropriate feedstocks for hydrocracking include straight run gas oils, vacuum gas oils, and catalytic cracker distillates. Preferred hydrocracking feedstocks include gas oils and other hydrocarbon fractions having at least 50 weight percent of their components boiling above 700° F. Such feedstocks will typically contain individual concentrations of nickel, vanadium, iron and copper less than about 8.0 ppmw, preferably less than about 5.0 ppmw, and most preferably less than about 1.0 ppmw. Normally, heavy hydrocarbon oils such as a heavy crude oil, a reduced crude oil, vacuum distillation residues and similar heavy materials are not suitable feedstocks for the process of the invention.

The catalyst of the invention will usually be employed as a fixed bed of catalytic extrudates in a hydrocracking reactor into which hydrogen and the feedstock are introduced and passed in a downwardly direction. The reactor vessel is maintained at conditions so as to convert the feedstock into the desired product, which is normally a hydrocarbon product containing a substantial portion of turbine fuel and diesel fuel components boiling in the range between 300° F. and 700° F. In general, the temperature of the reaction vessel is maintained between about 450° F. and about 850° F., preferably between about 600° F. and 800° F. The pressure will normally range between about 750 p.s.i.g. and about 2500 p.s.i.g., preferably between about 1000 and about 3000 p.s.i.g. The liquid hourly space velocity (LHSV) is typically between about 0.3 and 5.0, preferably between about 0.5 and 3.0, reciprocal hours. The ratio of hydrogen gas to feedstock utilized will usually range between 1,000 and about 15,000 standard cubic feet per barrel, preferably between about 2,000 and 8,000 standard cubic feet per barrel, as measured at 60° C. and 1 atmosphere.

The nature and objects of the invention are further illustrated by the following examples, which are provided for illustrative purposes and not to limit the invention as defined by the claims. The examples demonstrate that the catalyst of the invention containing nickel and tungsten components deposited on a support comprising a pillared clay, sepiolite, and an ultrahydrophobic zeolite is more selective for the production of middle distillates than a commercial catalyst now sold for midbarrel hydrocracking. The examples also demonstrate that a catalyst of the invention comprising a support containing a pillared clay and sepiolite is more selective than similar catalysts which differ in that the support of one contains a pillared clay and no sepiolite while the support of the other contains sepiolite and no pillared clay.

EXAMPLE 1

A pillared clay for use as a component of the catalyst of the invention was prepared by mixing about 100 grams of a white bentonite clay, which had been previously treated to remove iron and other color-producing impurities and which contained greater than 90 weight percent of the clay mineral montmorillonite, with 30 liters of deionized water to form a slurry. The clay was composed of 65.9 weight percent $SiO_2$, 14.1 weight percent $Al_2O_3$, 3.2 weight percent MgO, 1.5 weight percent CaO, 0.4 weight percent $Fe_2O_3$, 0.2 weight percent $TiO_2$, 4.1 weight percent $Na_2O$, and 0.1 weight percent $K_2O$. About 100 grams of an aluminum chlorhydroxide solution was diluted to about 5 liters with deionized water and allowed to hydrolyze for 24 hours at a temperature between 50° and 60° C. The aluminum chlorhydroxide solution utilized was Chlorhydrol solution manufactured and sold by the Reheis Chemical Company. The diluted aluminum chlorhydroxide solution was then slowly added to the slurry of clay and water and allowed to react for between 2 and 4 hours at about 60° C. The resultant flocculated product was filtered to produce a cake which was washed with an excess of hot deionized water and then oven-dried at 100° C. for 10 hours. The resultant dried material was calcined at 300° C. for 10 hours to remove water from the clay. An X-ray diffractogram of the resultant pillared clay indicated a uniform pillared structure having a first order reflection at 18.26 angstroms, which reflection corresponds to a pore height of about 8.66 angstroms. The measured BET surface area of the pillared clay was about 310 square meters per gram.

EXAMPLE 2

A catalyst of the invention was prepared by mixing 70 weight percent of the pillared clay prepared in Example 1, 20 weight percent of the layered magnesium silicate known as sepiolite, and 10 weight percent of the ultrahydrophobic zeolite known as LZ-10 zeolite, which zeolite contained less than about 0.1 weight percent sodium, calculated as $Na_2O$. The sepiolite used was obtained from TOLSA, S.A. as a relatively pure sepiolite essentially free of phase impurities. The sepiolite had a surface area of 177 square meters per gram, a pore volume of 0.66 cubic centimeters per gram, and contained 64.4 weight percent $SiO_2$, 27.8 weight percent MgO, 1.4 weight percent $Al_2O_3$, 0.41 weight percent $Fe_2O_3$, 0.14 weight percent CaO, and 0.1 weight percent $Na_2O$. The mixture of pillared clay, sepiolite and LZ-10 zeolite was impregnated with a sufficient amount of a solution containing nickel nitrate and ammonium metatungstate to saturate the pores of the mixed powders. The impregnating solution was made by dissolving nickel nitrate $[Ni(NO_3)_2 \cdot 6H_2O]$ and ammonium metatungstate $[(NH_4)_6H_2W_{12}O_{40}]$ in water. The impregnated powders were extruded in the form of a paste through a die having openings in the shape of a three-leaf clover. The extruded product was dried and then broken into particles of varying lengths up to about ½ inch. These particles were then dried at 200° F. for 10 hours and calcined at 900° F. for 2 hours. The dried and calcined catalyst particles had a final composition of 50 weight percent pillared bentonite, 14 weight percent sepiolite, 7 weight percent LZ-10 zeolite, 7 weight percent nickel components, calculated as NiO, and about 22 weight percent tungsten components, calculated as WO$_3$. The physical properties of the catalyst are set forth below in Table 1.

EXAMPLE 3

A comparative catalyst was prepared following the procedure of Example 2 except that the sepiolite in the catalyst was replaced with the pillared clay of Example 1. Thus, the extruded catalyst support particles, after drying and calcination, contained 90 weight percent pillared clay and 10 weight percent LZ-10 zeolite. After amine impregnation, the final catalyst contained 64 weight percent pillared clay, 7 weight percent LZ-10 zeolite, 7 weight percent nickel components, calculated as NiO, and 22 weight percent tungsten components, calculated as WO$_3$. The physical properties of this comparative catalyst are set forth in Table 1.

EXAMPLE 4

Another comparative catalyst was prepared as described in Example 2 except sepiolite was substituted for the pillared clay used therein. Thus, the extruded catalyst support particles, after being dried and calcined, contained 90 weight percent sepiolite and 10 weight percent LZ-10 zeolite. After impregnation with nickel and tungsten components, the final catalyst contained 64 weight percent sepiolite, 7 weight percent LZ-10 zeolite, 7 weight percent nickel components, calculated as NiO, and 22 weight percent tungsten components, calculated as WO$_3$. The physical properties of this catalyst, like that of the catalysts of Examples 2 and 3, are set forth in Table 1 below.

TABLE 1

| | Physical Properties | | | |
|---|---|---|---|---|
| | Commercial Catalyst | Ex. 2 Catalyst | Ex. 3 Catalyst | Ex. 4 Catalyst |
| BET Surface Area (m$^2$/g) | 285 | 202 | 162 | 222 |
| Hg Surface Area (m$^2$/g) | 226 | 22 | 27 | 38 |
| Hg Pore Volume (cc/g) | 0.39 | 0.16 | 0.15 | 0.36 |
| Average Pore Diameter (Å) | 69 | 201 | 220 | 388 |

EXAMPLE 5

The catalyst of the invention in Example 2, the comparative catalysts of Examples 3 and 4, and a commercial midbarrel hydrocracking catalyst were evaluated for hydrocracking activity and middle distillate selectivity utilizing a hydrotreated gas oil having the properties set forth in Table 2 below.

TABLE 2

| Feedstock Properties and Characteristics | | | |
|---|---|---|---|
| | | Distillation, D-1160 | |
| | | Vol. % | °F. |
| Gravity, °API | 38.0 | IBP/5 | 436/588 |
| Pour Point, °F. | 113 | 10/20 | 644/698 |
| Sulfur, wt. % | 0.0030 | 30/40 | 735/773 |
| Nitrogen, wt. % | 0.0035 | 50/60 | 813/849 |
| Hydrogen, wt. % | 14.5 | 70/80 | 885/932 |
| Carbon, wt. % | 86.5 | 90/95 | 991/1038 |
| Flash Point, °F. | 260 | Max/Rec | 1073/99.0% |

The commercial catalyst, which was obtained from the Linde Division of Union Carbide Corporation (now UOP), contained 50 weight percent of a silica-alumina dispersion in a gamma aluminum matrix, which dispersion contained 55 weight percent alumina and 45 weight percent silica, about 14 weight percent peptized alumina binder, 7 weight percent ion-exchanged LZ-10 zeolite, and, like the catalysts of Examples 2 through 4, about 7 weight percent nickel components, calculated as NiO, and about 22 weight percent tungsten components, calculated as WO$_3$. The physical properties of this commercial catalyst are set forth in Table 1. Each of these catalysts was separately tested by passing the hydrotreated gas oil, to which thiophene and tert-butyl amine had been added to simulate an integral hydrotreating-hydrocracking operation, on a once-through basis through an isothermal reactor containing about 140 milliliters of the catalyst mixed with 95 milliliters of 6 to 8 mesh quartz. The reactor was operated at a liquid hourly space velocity (LHSV) of 1.0 reciprocal hour, a pressure of 2,000 p.s.i.g. and a once-through hydrogen flow rate of 10,000 standard cubic feet per barrel. The temperature of the reactor was adjusted periodically to maintain a total liquid product API gravity of 39.1°, which, by previously established correlations, corresponds to about a 60 volume percent yield of materials boiling below 700° F. The results of these tests are set forth in Table 3 below.

TABLE 3

| Catalyst** | Composition of Support (Wt. %) | Activity Reactor Temp. to Provide 60% Conversion | Selectivity Vol. % Converted to | |
|---|---|---|---|---|
| | | | Turbine 300–550° F. | Diesel 300–700° F. |
| Example 2 | 70% pillared clay 20% sepiolite 10% LZ-10 | 697° F.* | 72.2* | 83.9* |
| Example 3 | 90% pillared clay 10% LZ-10 | 696° F. | 69.6 | 81.4 |
| Example 4 | 90% sepiolite 10% LZ-10 | 721° F. | 68.0 | 79.7 |
| Commercial | 70% silica-alumina in alumina 20% peptized alumina 10% LZ-10 | 718° F. | 70.0 | 81.5 |

*Average of two runs.
**All catalysts contained about 7 weight percent NiO and 22 weight percent WO$_3$.

As can be seen from the data in Table 3, the catalyst of the invention, i.e., the Example 2 catalyst, is 21° F. (697° F. vs. 718° F.) more active than the commercial catalyst. This differential in activity temperature represents about a 70 percent improvement in activity which means that the catalyst of the invention can be used for hydrocracking a given feedstock under the same operating conditions as the commercial catalyst but at a feed rate that is 70 percent higher. Alternatively, the catalyst of the invention could be used to produce the same conversion as the commercial catalyst at the same feed rate but initially at a temperature 21° F. lower. This temperature differential represents a significant savings in fuel when using the catalyst of the invention as compared to the commercial catalyst. In addition to possessing an increased activity over the commercial catalyst, the catalyst of the invention also has a higher selectivity for components boiling in the turbine fuel range of 300° to 550° F. (72.2 vs. 70.0 volume percent) and a higher selectivity for components boiling in the diesel fuel range of 300° to 700° F. (83.9 vs. 81.5 volume percent).

A comparison of the results for the catalyst of the invention versus the comparative catalyst of Example 3 indicates that the two catalysts have approximately the same activity but that the catalyst of the invention is about 2.5 volume percentage points (72.2 vs. 69.6 and 83.9 vs. 81.4) more selective for components boiling in the turbine and diesel fuel ranges. A comparison of the catalyst of the invention with the comparative catalyst of Example 4 shows that the catalyst of the invention is significantly more active, i.e., 697° F. versus 721° F., and approximately 4.2 volume percentage points (72.2 vs. 68.0 and 83.9 vs. 79.7) more selective for components boiling in both the turbine fuel and diesel fuel ranges. The fact that the catalyst of the invention is more selective for turbine fuel and diesel fuel than both the Example 3 and Example 4 catalysts without being less active than either is totally unexpected considering that the supports of the Examples 3 and 4 catalysts contain 90 weight percent pillared clay and 90 weight percent sepiolite, respectively, while the support of the catalyst of the invention contains 70 weight percent pillared clay and 20 weight percent sepiolite. The expected selectivities for the catalyst of the invention would be somewhere between the selectivities of the Examples 3 and 4 catalysts.

It will be apparent from the foregoing that the invention provides a midbarrel hydrocracking catalyst which is more active and selective for middle distillate components than currently available commercial catalysts. Moreover, the midbarrel catalyst of the invention, which contains an intercalated clay and a layered magnesium silicate in its support, is unexpectedly more selective than would be predicted from similar catalysts which contain one of these components but not the other.

Although this invention has been primarily described in conjunction with examples and by references to embodiments thereof, it is evident that many alternatives, modifications, and variations will be apparent to those skilled in the art in light of the foregoing description. Accordingly, it is intended to embrace within the invention all such alternatives, modifications, and variations that fall within the spirit and scope of the appended claims.

I claim:

1. A hydrocracking process for selectively producing middle distillate products which comprises contacting a hydrocarbon feedstock with a catalyst composition in the presence of hydrogen under hydrocracking conditions, wherein said catalyst composition comprises:
   (a) a hydrogenation component;
   (b) a layered magnesium silicate; and
   (c) an intercalated clay having cracking activity.

2. A process as defined in claim 1 wherein said hydrogenation component comprises a metal selected from Group VIB or Group VIII of the Periodic Table of Elements.

3. A process as defined by claim 1 wherein said catalyst composition contains a hydrogenation component comprising a Group VIB metal and a hydrogenation component comprising a Group VIII metal.

4. A process as defined by claim 3 wherein said Group VIB hydrogenation metal component comprises molybdenum or tungsten and said Group VIII hydrogenation metal component comprises nickel or cobalt.

5. A process as defined by claim 1 wherein said layered magnesium silicate is sepiolite.

6. A process as defined by claim 1 wherein said layered magnesium silicate is attapulgite.

7. A process as defined by claim 1 wherein said intercalated clay is a pillared clay.

8. A process as defined by claim 1 wherein said intercalated clay is a delaminated clay.

9. A process as defined by claim 1 wherein said catalyst composition further comprises a crystalline molecular sieve.

10. A process as defined by claim 9 wherein said molecular sieve is a modified Y zeolite.

11. A process as defined by claim 10 wherein said modified Y zeolite has a unit cell size between about 24.20 and 24.35 angstroms and a water vapor sorptive capacity less than 5 weight percent of said zeolite at 25° C. and a p/p° value of 0.10.

12. A process as defined by claim 11 wherein said modified Y zeolite is LZ-10 zeolite.

13. A process as defined by claim 9 wherein said molecular sieve is selected from the group consisting of galliosilicates, aluminophosphates, silicoaluminophosphates, borosilicates, titanium aluminophosphates, chromosilicates, ferrosilicates, titanium aluminosilicates, titanium silicates, gallioaluminosilicates, and crystalline silicas.

14. A process as defined by claim 1 wherein said hydrogenation component is deposited on a support comprising between about 10 and about 30 weight percent of said layered magnesium silicate and between about 65 and about 95 weight percent of said intercalated clay.

15. A process as defined by claim 9 wherein said support further comprises between about 5 and about 20 weight percent of said crystalline molecular sieve.

16. A process as defined by claim 9 wherein said crystalline molecular sieve has a pore size greater than about 7.0 angstroms.

17. A hydrocracking process for selectively producing middle distillate products which comprises contacting a hydrocarbon feedstock with a catalyst composition in the presence of hydrogen under hydrocracking conditions, wherein said catalyst composition comprises:
   (a) a hydrogenation component comprising a metal selected from Group VIB or Group VIII of the Periodic Table of Elements;
   (b) sepiolite; and
   (c) a pillared clay.

18. A process as defined by claim 17 wherein said catalyst composition contains a hydrogenation metal component comprising a Group VIB metal and a hydrogenation metal component comprising a Group VIII metal.

19. A process as defined by claim 18 wherein said Group VIB metal is tungsten and said Group VIII metal is nickel.

20. A process as defined by claim 17 wherein said pillared clay comprises inorganic metal clusters selected from the group consisting of zirconium oxide clusters, aluminum oxide clusters, tin oxide clusters, titanium oxide clusters, chromium oxide clusters, antimony oxide clusters, silicon dioxide clusters, molybdenum oxide clusters, tungsten oxide clusters, phosphorous oxide clusters, iron oxide clusters, nickel oxide clusters, rare earth oxide clusters, and cobalt oxide clusters.

21. A process as defined by claim 17 wherein said pillared clay is a pillared montmorillonite.

22. A process as defined by claim 17 wherein said pillared clay is a pillared hectorite.

23. A process as defined by claim 21 wherein said montmorillonite is pillared with aluminum oxide clusters.

24. A process as defined by claim 21 wherein said montmorillonite is pillared with zirconium oxide clusters.

25. A process as defined by claim 23 wherein said catalyst composition further comprises a zeolitic molecular sieve having a constraint index less than 1.0.

26. A process as defined by claim 25 wherein said zeolitic molecular sieve is LZ-10 zeolite.

27. A hydrocracking process for selectively producing middle distillate products which comprises contacting a hydrocarbon feedstock with a catalyst composition in the presence of hydrogen under hydrocracking conditions, wherein said catalyst composition consists essentially of:
(a) at least one hydrogenation metal component;
(b) a layered magnesium silicate;
(c) an intercalated clay; and
(d) a zeolitic molecular sieve.

28. A process as defined by claim 27 wherein said catalyst composition contains a hydrogenation component comprising tungsten and a hydrogenation component comprising nickel.

29. A process as defined by claim 28 wherein said layered magnesium silicate is sepiolite, said intercalated clay is a pillared clay, and said zeolitic molecular sieve is LZ-10 zeolite.

30. A process as defined by claim 29 wherein said pillared clay comprises montmorillonite pillared with aluminum oxide clusters.

31. A process as defined by claim 1 wherein said layered magnesium silicate is hectorite.

* * * * *

UNITED STATES PATENT AND TRADEMARK OFFICE
CERTIFICATE OF CORRECTION

PATENT NO. : 5,076,907

DATED : December 31, 1991

INVENTOR(S) : Mario L. Occelli

It is certified that error appears in the above-identified patent and that said Letters Patent is hereby corrected as shown below:

Col. 16,
Claim 9, line 9, after "sieve" insert --having cracking activity--.

Col. 16,
Claim 20, line 64, delete "phosphorous" and insert --phosphorus--.

Signed and Sealed this

Twenty-fourth Day of August, 1993

Attest:

BRUCE LEHMAN

Attesting Officer

Commissioner of Patents and Trademarks